Figure 1:
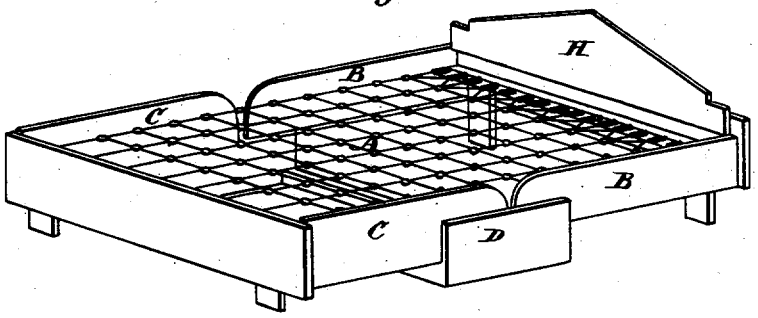

S. S. BURR.
WARDROBE BEDSTEADS.

No. 7,892. Reissued Sept. 18, 1877.

*Attest:*
O. A. Cowl
Levi Bacon

*Inventor:*
Sanford S. Burr, by
his attorney M. Bailey.

N. PETERS, PHOTO-LITHOGRAPHER, WASHINGTON, D. C.

UNITED STATES PATENT OFFICE.

SANFORD S. BURR, OF DEDHAM, MASSACHUSETTS.

IMPROVEMENT IN WARDROBE-BEDSTEADS.

Specification forming part of Letters Patent No. 179,513, dated July 4, 1876; Reissue No. 7,892, dated September 18, 1877; application filed April 21, 1877.

*To all whom it may concern:*

Be it known that I, SANFORD S. BURR, of Dedham, Massachusetts, have invented certain new and useful Improvements in Folding Wardrobe or Cabinet Bedsteads, which improvements are fully set forth in the following specification, reference being had to the accompanying drawings.

This invention relates to folding wardrobe or cabinet bedsteads, in which the bed, when folded, is received and contained in an upright inclosing-case; and consists in combining a flexible and longitudinally-elastic suspension bed-bottom with a jointed frame, whereby the bed may be so folded as to reduce its length or width, and at the same time relax the tension of the springs which form or support the bed-bottom; also, in the combination of an inclosing-case with the folding suspension bed-bottom, whereby the tension upon the bed-bottom is relaxed when folded, and the entire space within the case may be devoted to the storage of bed and bedding.

Heretofore, in the construction of folding beds, it has been customary to use springs which had a vertical play when in ordinary use. This arrangement demands an amount of space in the folding case equal to twice the yield of the springs, for when the ends are turned up in folding the bed the spring-space, which before was beneath the bed, is found at each side thereof, between the sides of the inclosing-case and the mattress or bedding inclosed, consequently the case necessarily was of large size and cumbersome. It has been my object to remove this difficulty, to economize space, and to reduce the size of the bedstead, especially in the direction of its breadth or thickness, when folded, and it is to this end that I have combined with the folding bed-frame a flexible bed-bottom that is longitudtudinally elastic or extensible, and is suspended from the bed-frame by its ends alone—that is to say, is connected with and derives its support from the bed-frame at its ends only.

The combination of a folding frame with a flexible bed-bottom under the two above-specified conditions is essential to my invention. The object of making the bed-bottom longitudinally elastic or extensible is to adapt it to be stretched or put under tension by the unfolding of the bed-frame. The object of suspending it from the bed-frame by its ends alone is that when it is relieved from tension and folded by the folding of the bed-frame it may, between its ends, be entirely slack and free to spread apart, so as to occupy the space which, when the bed is unfolded, is left beneath the bed-bottom to allow the necessary vertical play of the mattress. This space in ordinary folding bedsteads has been occupied by coiled springs, as above stated, and could not, consequently, be utilized for any other purpose. Under my invention this space is made available for reception of the bed and bedding when the bedstead is folded and the bed-bottom is off tension. I am thus enabled to reduce considerably the thickness of the case, economizing space and material, and making a more sightly article of furniture.

Figure 4:
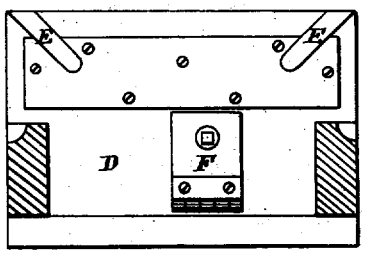
Figure 2:
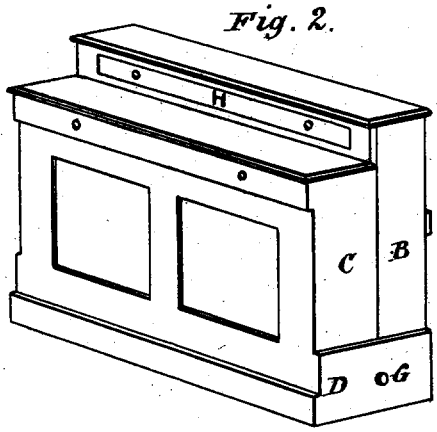
Figure 3:
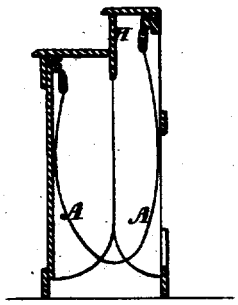

In the drawings, Figure 1 is a perspective view of my improved bed open for use. Fig. 2 is a view of the same closed. Fig. 3 is a vertical section through the center of the closed bed. Fig. 4 is an inner view of one end of the base and its attachments.

A is the bed-bottom, suspended by its ends from the cross-rails at the head and foot of the frame, and formed of woven or linked wire or other suitable elastic or flexible material. If flexible only, it should be provided at one or both ends with longitudinally-extensible springs, by which it is attached to the end pieces of the frame, which method I have found in practice to be eminently satisfactory. B and C represent, respectively, the head and foot sections of the jointed frame, which are pivoted to the base D in any proper manner. It is important that these pivots be made very strong, and that they be located nearly in the same horizontal plane as the bed-bottom, otherwise extreme difficulty would be found in obtaining adequate power to give tension to the springs in opening the bed, and there would be a tendency of the ends to rise under the power of the springs. But with the great leverage obtained by locating the pivot just below the plane of the bed-bottom a few pounds' downward pressure on the foot or head of the frame, after the other end has been let down, will be sufficient to give the necessary tension to the bed-bottom, and this tension, with the consequent tendency of the ends of the bed-frame to rise, aids in folding the bed until the tension is relaxed.

The arrangement which I prefer for pivoting the sections B and C to the base D is shown in Fig. 4, in which E E represent inclined grooves in the base or in a casting attached thereto. A pivot projects outwardly from each side of the two sections B C of the frame at their inner ends, and each pivot engages in one of the inclined grooves E E in the base D, and forms a fulcrum for the lever B or C. With this construction the sections B and C can be removed from the base and slipped one partially within the other, for convenience in transportation, before the bed-bottom has been attached. The pivots may, of course, permanently connect the two sections to the base, if desired. A hinged block, F, at one or both ends of the base, serves as a check to prevent either of the sections from closing prematurely, as the upper edge of the block fits snugly beneath the lower edge of the pivoted sections B and C, so that they cannot turn upon their pivots until the block is removed. It is operated by a rod or cord, G. Instead of this arrangement a rotating arm, a hook, or other equivalent means may be employed to accomplish the same result. The head and foot of the sections B and C are each provided with legs or other supports, which may be folded out of the way. The head-board H may be hinged to the end piece of section B, so as to drop between the sections when folded, or to rest upon the end piece of section C, with more or less of inclination, to give it the appearance of a writing-desk. The front of the case is properly paneled or carved to represent doors, drawers, &c., and the rear of the case may be closed entirely or left partially open. The two sections of the case are hooked or otherwise secured to each other.

I claim as my invention—

1. In a folding wardrobe or cabinet bedstead, in which the bed, when folded, is received and contained in an upright inclosing-case, the combination, with a hinged and folding bed-frame, of longitudinally-elastic or extensible and flexible bed-bottom, suspended from the bed-frame by its ends alone, and under tension only when the bed-frame is unfolded, substantially as set forth.

2. A folding wardrobe or cabinet bedstead, containing a flexible and elastic bed-bottom, supported within the case by its ends only, leaving sufficient unobstructed space beneath the mattress for the elastic requirements of the bed when spread for use, and permitting the bed-bottom and the bedding thereon to occupy such unobstructed space within the case when folded, substantially as specified.

3. In combination with the base and the elastic bed-bottom, the pivoted bed-frame sections, provided with the means herein described to prevent their premature folding, substantially as specified.

In testimony whereof I have hereunto signed my name this 18th day of April, A. D. 1877.

SANFORD S. BURR.

Witnesses:

FRED. F. DAGGETT,

EDW. B. MORSE.